(12) United States Patent
Ichikawa

(10) Patent No.: US 8,350,527 B2
(45) Date of Patent: Jan. 8, 2013

(54) CHARGING SYSTEM

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/379,202

(22) PCT Filed: Dec. 21, 2009

(86) PCT No.: PCT/JP2009/071215
§ 371 (c)(1),
(2), (4) Date: Dec. 19, 2011

(87) PCT Pub. No.: WO2011/077505
PCT Pub. Date: Jun. 30, 2011

(65) Prior Publication Data
US 2012/0098488 A1    Apr. 26, 2012

(51) Int. Cl.
*H02J 7/00* (2006.01)
*H01R 11/00* (2006.01)
(52) U.S. Cl. ......... 320/109; 320/104; 320/128; 439/503
(58) Field of Classification Search .................. 320/103, 320/104, 109, 111; 180/65.1, 65.21, 65.31; 439/34, 503; 307/10.1, 10.7; 702/57, 63; 340/635–636.2
See application file for complete search history.

(56) References Cited

U.S. PATENT DOCUMENTS

| | | | |
|---|---|---|---|
| 5,596,258 A * | 1/1997 | Kimura et al. | 320/163 |
| 6,300,742 B1 * | 10/2001 | Hung | 320/105 |
| 7,116,238 B2 * | 10/2006 | Nishimura et al. | 340/635 |
| 7,886,857 B2 * | 2/2011 | Fujitake | 180/65.29 |
| 8,215,963 B2 * | 7/2012 | Ichikawa et al. | 439/34 |
| 8,242,627 B2 * | 8/2012 | Ichikawa | 307/10.1 |
| 2009/0079389 A1 * | 3/2009 | Ohtomo | 320/109 |
| 2009/0306841 A1 | 12/2009 | Miwa et al. | |
| 2011/0207358 A1 * | 8/2011 | Ichikawa et al. | 439/345 |
| 2011/0300753 A1 * | 12/2011 | Ichikawa et al. | 439/620.21 |

FOREIGN PATENT DOCUMENTS

| | | |
|---|---|---|
| JP | A-2008-285075 | 11/2008 |
| JP | A-2009-33265 | 2/2009 |
| JP | A-2009-213301 | 9/2009 |
| JP | A-2010-166768 | 7/2010 |
| WO | WO 2009/090813 A1 | 7/2009 |

OTHER PUBLICATIONS

International Search Report dated Mar. 16, 2010 in International Application No. PCT/JP2009/071215.
Decision to Grant Patent dated Nov. 8, 2011 in Japanese Patent Application No. 2011-540242 (with translation).

* cited by examiner

*Primary Examiner* — Richard V Muralidar
(74) *Attorney, Agent, or Firm* — Oliff & Berridge, PLC

(57) ABSTRACT

A vehicle includes a charging port, a charger, a motive power output device, a PLC processing unit, and a charging ECU. The charging port is configured so that a charging cable can be connected to the charging port. The PLC processing unit uses the charging port and the charging cable as a communication path for performing PLC-based communication with a PLC processing unit of a house. In the case where PLC-based communication has come to an end when external charging comes to an end, the charging ECU controls a relay of a CCID so that it is in OFF state and, in the case where PLC-based communication is continuing when external charging comes to an end, it maintains the relay of the CCID in ON state.

6 Claims, 9 Drawing Sheets

CHARGING SYSTEM

TECHNICAL FIELD

The present invention relates to a charging system, and particularly to a charging system for charging a power storage device mounted on a vehicle by means of a charging cable, from a power supply external to the vehicle.

BACKGROUND ART

Japanese Patent Laying-Open No. 2009-33265 (PTL 1) discloses a charging system capable of charging a battery mounted on a vehicle from a power supply external to the vehicle. In this charging system, a commercial power supply is connected via a cable to a charging port for charging the battery mounted on the vehicle, and the vehicle-mounted battery can be charged by the commercial power supply. Further, the vehicle and the commercial power supply are each provided with a PLC processing unit, and communication can be performed via the charging port and the cable between the vehicle and a data processor for the commercial power supply (see PTL 1).

CITATION LIST

Patent Literature

PTL 1: Japanese Patent Laying-Open No. 2009-33265

SUMMARY OF INVENTION

Technical Problem

The charging system disclosed in the above-referenced publication, however, does not give consideration to the relation between the timing at which charging of the vehicle-mounted battery by the commercial power supply comes to an end, and the timing at which communication performed via the charging port and the cable comes to an end. If the charging path is electrically broken at the time when charging of the battery ends, communication will be interrupted while data to be communicated is left.

The present invention has thus been made to solve the problem above, and an object of the invention is to provide a charging system that enables a power storage device mounted on a vehicle to be charged by means of a charging cable from a power supply external to the vehicle, and enables communication which is performed via the charging cable to be reliably accomplished to the end of communication.

Solution to Problem

According to the present invention, a charging system includes a vehicle, a charging cable, and a relay. The vehicle is configured to be chargeable by an external power supply which is located externally to the vehicle. The charging cable is used for supplying electric power from the external power supply to the vehicle. The relay is provided on the charging cable. The vehicle includes a rechargeable power storage device, a charging port, a charger, a control unit, and a communication unit. The charging port is configured so that the charging cable can be connected to the charging port. The charger is used to receive electric power supplied from the external power supply for charging the power storage device. The control unit controls the relay so that the relay is in an ON state while the power storage device is charged by the charger. The communication unit uses the charging port and the charging cable as a communication path for communicating with a communication device external to the vehicle. The control unit controls the relay so that the relay is in an OFF state, in a case where communication with the communication device external to the vehicle by the communication unit has come to an end when charging of the power storage device by the charger comes to an end. The control unit maintains the relay in the ON state, in a case where communication with the communication device by the communication unit is continuing when charging of the power storage device by the charger comes to an end.

Preferably, the charging system further includes a signal generation unit. The signal generation unit is configured to generate a pilot signal for detecting a state of the vehicle and transmit the pilot signal to the vehicle via the charging cable. The control unit includes a signal manipulation unit. The signal manipulation unit is configured to manipulate a potential of the pilot signal for informing the signal generation unit of the state of the vehicle. The signal manipulation unit manipulates the potential of the pilot signal in accordance with whether or not communication with the communication device external to the vehicle by the communication unit has come to an end when charging of the power storage device by the charger comes to an end. The signal generation unit manipulates the relay in accordance with the potential of the pilot signal.

Preferably, the charging system further includes a lock mechanism. The lock mechanism is used for locking a state of connection between the charging cable and the charging port. The control unit further controls the lock mechanism so that the state of connection is locked while the power storage device is charged by the charger. The control unit further controls the lock mechanism so that the state of connection is unlocked, in a case where communication with the communication device external to the vehicle by the communication unit has come to an end when charging of the power storage device by the charger comes to an end. The control unit further controls the lock mechanism so that the state of connection continues being locked, in a case where communication with the communication device by the communication unit is continuing when charging of the power storage device by the charger comes to an end.

Preferably, the control unit further calculates time for charging required for charging the power storage device by the charger and time for communication required for communicating with the communication device external to the vehicle by the communication unit, and adjusts the time for charging so that communication with the communication device is completed, in a case where the time for communication is longer than the time for charging.

More preferably, the control unit changes timing at which charging of the power storage device is started so that communication with the communication device is completed when charging of the power storage device by the charger comes to an end, in a case where the time for communication is longer than the time for charging.

Still more preferably, the control unit changes a rate of charging the power storage device so that the time for charging is equal to or longer than the time for communication, in a case where the time for communication is longer than the time for charging.

Advantageous Effects of Invention

According to the present invention, a charging cable can be connected to a charging port to thereby charge a power storage device mounted on a vehicle from a power supply external to the vehicle. Further, the charging port and the charging cable are used as a communication path to thereby perform electric power line communication (hereinafter also referred to as PLC (Power Line Communication)) with a communication device external to the vehicle. In the case where PLC-based communication has come to an end at the time when charging of the power storage device by a charger ends, a relay provided on the charging cable is controlled so that the relay is in an OFF state. In the case where PLC-based communication is continuing at the time when charging of the power storage device by the charger ends, the relay is kept in an ON state. Therefore, it will not occur that PLC-based communication is interrupted at the time when charging of the power storage device by the charger comes to an end.

Accordingly, the present invention can implement a charging system that enables a power storage device mounted on a vehicle to be charged by means of a charging cable from an external power supply, and enables PLC-based communication performed via the charging cable to be reliably accomplished to the end of communication.

DESCRIPTION OF EMBODIMENTS

Figure 1:
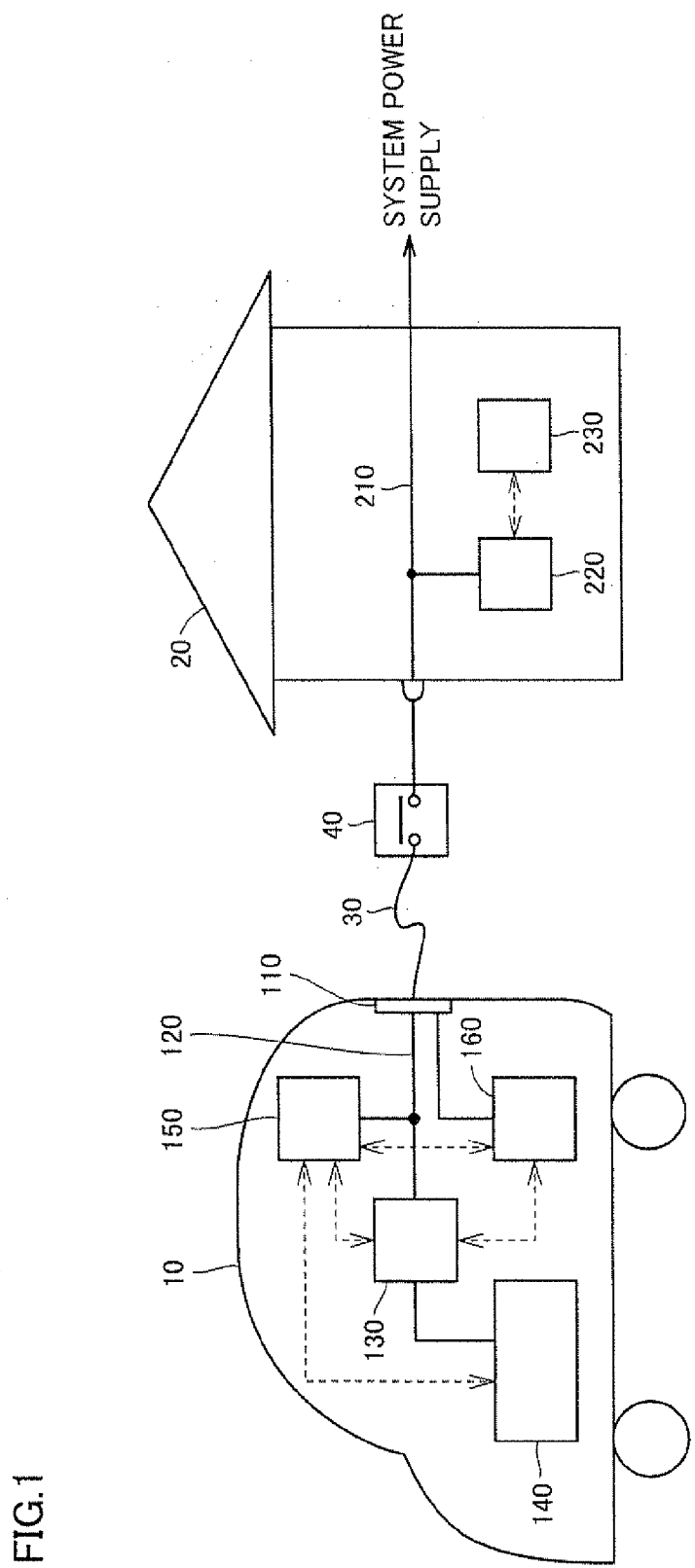
FIG. 1 is a diagram of an overall configuration of a charging system according to a first embodiment of the present invention.

Embodiments of the present invention will hereinafter be described in detail with reference to the drawings. In the drawings, the same or corresponding components are denoted by the same reference characters, and a description thereof will not be repeated.

First Embodiment

FIG. 1 is a diagram of an overall configuration of a charging system according to a first embodiment of the present invention. Referring to FIG. 1, this charging system includes a vehicle 10, a house 20, a charging cable 30, and a CCID (Charging Circuit Interrupt Device) 40.

In this charging system, charging cable 30 is connected between vehicle 10 and an electrical outlet of house 20 to thereby enable a power storage device mounted on vehicle 10 to be charged by a commercial power supply (system power supply for example) external to the vehicle. In the following, the power supply external to the vehicle will also be referred to as "external power supply" and charging of vehicle 10 by the external power supply will also be referred to as "external charging."

Vehicle 10 includes a charging port 110, an electric power input line 120, a charger 130, a motive power output device 140, a PLC processing unit 150, and a charging ECU (Electronic Control Unit) 160. Charging port 110 is configured so that charging cable 30 can be connected to the charging port. Charger 130 is connected to charging port 110 by electric power input line 120. Based on a control signal from charging ECU 160, charger 130 converts electric power which is input from charging port 110 into a predetermined charging voltage, and outputs the voltage to the power storage device (not shown) included in motive power output device 140. When the vehicle is externally charged, charger 130 transmits and receives a wide variety of predetermined data to and from PLC processing unit 150.

Motive power output device 140 outputs drive power for vehicle 10 to travel. Further, motive power output device 140 includes the power storage device (not shown). When the vehicle is externally charged, the power storage device is charged by charger 130. Motive power output device 140 also transmits and receives a wide variety of predetermined data to and from PLC processing unit 150 when the vehicle is externally charged.

PLC processing unit 150 is connected to electric power input line 120. When the vehicle is externally charged, PLC processing unit 150 can use charging port 110 and charging cable 30 as a communication path to perform PLC-based communication with a PLC processing unit 220 provided at house 20, based on a communication command from charging ECU 160. This PLC processing unit 150 is configured by a modem for example. When the vehicle is externally charged, PLC processing unit 150 receives from electric power input line 120 data of a high-frequency signal that is transmitted from PLC processing unit 220 of house 20 and demodulates the received data, and also modulates and outputs data to electric power input line 120 that is to be transmitted to PLC processing unit 220 of house 20. It is noted that, while the frequency of AC power supplied via charging cable 30 from the system power supply to vehicle 10 is for example 50 Hz or 60 Hz in Japan, the frequency of the high-frequency signal communicated via charging cable 30 when PLC-based communication is performed is for example from a few MHz to several tens of MHz.

Charging ECU 160 controls external charging by means of charger 130 as well as PLC-based communication with a system component external to the vehicle by means of PLC processing unit 150. When the vehicle is externally charged, charging ECU 160 manipulates the potential of a pilot signal (which will be described later herein) received from CCID 40 to thereby convey the state of vehicle 10 to CCID 40 and remotely manipulate a relay provided to CCID 40. Further, charging ECU 160 generates a control signal for driving charger 130, and outputs the generated control signal to charger 130. Furthermore, charging ECU 160 generates a communication command for allowing PLC-based communication to be performed between PLC processing unit 150 and PLC processing unit 220 of house 20, and outputs the communication command to PLC processing unit 150.

Here, if the relay of CCID 40 is turned off at the time when external charging comes to an end, communication is interrupted in the case where data to be communicated based on PLC is left. In contrast, according to the first embodiment, the relay of CCID 40 is turned off if PLC-based communication has come to an end at the time when external charging ends, while the relay of CCID 40 is kept in the ON state if PLC-based communication is continuing at the time when external charging ends. The configuration of charging ECU 160 and processes executed by charging ECU 160 will be described in detail later herein.

House 20 includes an electric power line 210, PLC processing unit 220, and a server 230. Electric power line 210 is connected to the system power supply. When vehicle 10 is externally charged, charging cable 30 is connected to an electrical outlet for electric power line 210.

PLC processing unit 220 is connected to electric power line 210. When vehicle 10 is externally charged, PLC processing unit 220 can use charging cable 30 and charging port 110 of vehicle 10 as a communication path to perform PLC-based communication with PLC processing unit 150 of vehicle 10. Like PLC processing unit 150 of vehicle 10, this PLC processing unit 220 is also configured by a modem for example. When the vehicle is externally charged, PLC processing unit 220 receives from electric power line 210 data of a high-frequency signal that is transmitted from PLC processing unit 150 of vehicle 10 and demodulates the received data, and also modulates and outputs data to electric power line 210 that is to be transmitted to PLC processing unit 150 of vehicle 10.

Server 230 controls PLC-based communication with vehicle 10 by means of PLC processing unit 220. Server 230 generates a communication command for causing PLC-based communication to be performed between PLC processing unit 220 and PLC processing unit 150 of vehicle 10, and outputs the communication command to PLC processing unit 220.

Figure 2:
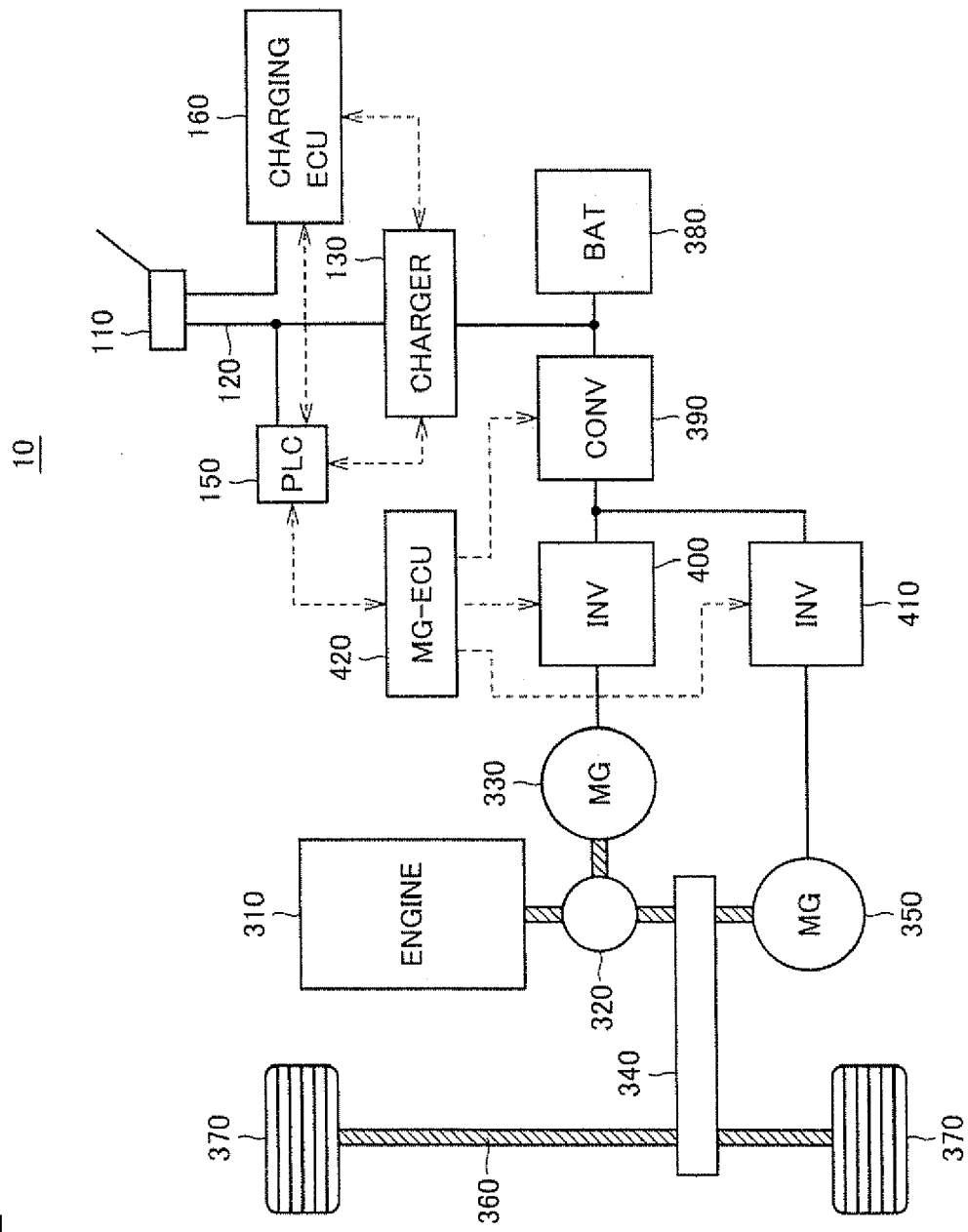
FIG. 2 is an overall block diagram of a vehicle shown in FIG. 1.

FIG. 2 is an overall block diagram of vehicle 10 shown in FIG. 1. By way of example, FIG. 2 illustrates the case where vehicle 10 is a hybrid vehicle. Referring to FIG. 2, vehicle 10 includes an engine 310, a power split device 320, motor generators 330, 350, a reduction gear 340, a drive shaft 360, and drive wheels 370. Vehicle 10 further includes a power storage device 380, a boost converter 390, inverters 400, 410, and an MG-ECU 420. Vehicle 10 also includes, as shown in FIG. 1, charging port 110, electric power input line 120, charger 130, PLC processing unit 150, and charging ECU 160.

Engine 310 and motor generators 330, 350 are coupled to power split device 320. Vehicle 10 is caused to travel by drive power from at least one of engine 310 and motor generator 350. Motive power generated by engine 310 is split into two paths by power split device 320. Specifically, one of the paths is used to transmit the motive power through reduction gear 340 to drive shaft 360, and the other thereof is used for transmitting the motive power to motor generator 330.

Motor generator 330 is an AC rotating electric machine, and is a three-phase AC synchronous motor, for example. Motor generator 330 generates electric power by using the motive power of engine 310 split by power split device 320. For example, when a state of charge (also referred to as "SOC (State of Charge)") of power storage device 380 falls below a predetermined value, engine 310 starts and electric power is generated by motor generator 330. The electric power generated by motor generator 330 is converted from AC to DC by inverter 400, stepped down by boost converter 390, and stored in power storage device 380.

Motor generator 350 is an AC rotating electric machine, and is a three-phase AC synchronous motor, for example. Motor generator 350 generates drive power for the vehicle by using at least one of the electric power stored in power storage device 380 and the electric power generated by motor generator 330. The drive power of motor generator 350 is transmitted through reduction gear 340 to drive shaft 360.

It is noted that, when the vehicle is braked, motor generator 350 is driven by using kinetic energy of the vehicle, and motor generator 350 operates as a generator. Thus, motor generator 350 operates as a regenerative brake for converting braking energy into electric power. The electric power generated by motor generator 350 is stored in power storage device 380.

Power split device 320 is formed of a planetary gear train including a sun gear, a pinion gear, a carrier, and a ring gear. The pinion gear engages the sun gear and the ring gear. The carrier rotatably supports the pinion gear, and in addition, is coupled to a crankshaft of engine 310. The sun gear is coupled to a rotation shaft of motor generator 330. The ring gear is coupled to a rotation shaft of motor generator 350 and reduction gear 340.

Power storage device 380 is a rechargeable DC power supply, and is formed of a secondary battery such as nickel-metal hydride or lithium ion battery, for example. In addition to the electric power generated by motor generators 330 and 350, electric power supplied from a power supply external to the vehicle (the system power supply in FIG. 1) and input from charging port 110 when the vehicle is externally charged is also stored in power storage device 380. It is noted that a large-capacitance capacitor may also be employed as power storage device 380.

Boost converter 390 adjusts a DC voltage to be provided to inverters 400 and 410 to be equal to or higher than the voltage of power storage device 380, based on a control signal from MG-ECU 420. Boost converter 390 is configured by a boost chopper circuit, for example.

Inverter 400 converts the electric power generated by motor generator 330 into DC power and outputs the DC power to boost converter 390, based on a control signal from MG-ECU 420. Inverter 410 converts electric power supplied from boost converter 390 into AC power and outputs the AC power to motor generator 350, based on a control signal from MG-ECU 420. It is noted that, at startup of engine 310, inverter 400 converts the electric power supplied from boost converter 390 into AC power and outputs the AC power to motor generator 330. When the vehicle is braked, inverter 410 converts the electric power generated by motor generator 350 into DC power and outputs the DC power to boost converter 390.

MG-ECU 420 generates control signals for driving boost converter 390 and motor generators 330, 350, and outputs the generated control signals to boost converter 390 and inverters 400, 410.

Since charging port 110, electric power input line 120, charger 130, PLC processing unit 150, and charging ECU 160 have been explained in connection with FIG. 1, the description will not be repeated. Charger 130 is connected between power storage device 380 and boost converter 390.

It is noted that engine 310, power split device 320, motor generators 330, 350, reduction gear 340, drive shaft 360, drive wheels 370, power storage device 380, boost converter 390, inverters 400, 410, and MG-ECU 420 constitute motive power output device 140 shown in FIG. 1.

Figure 3:
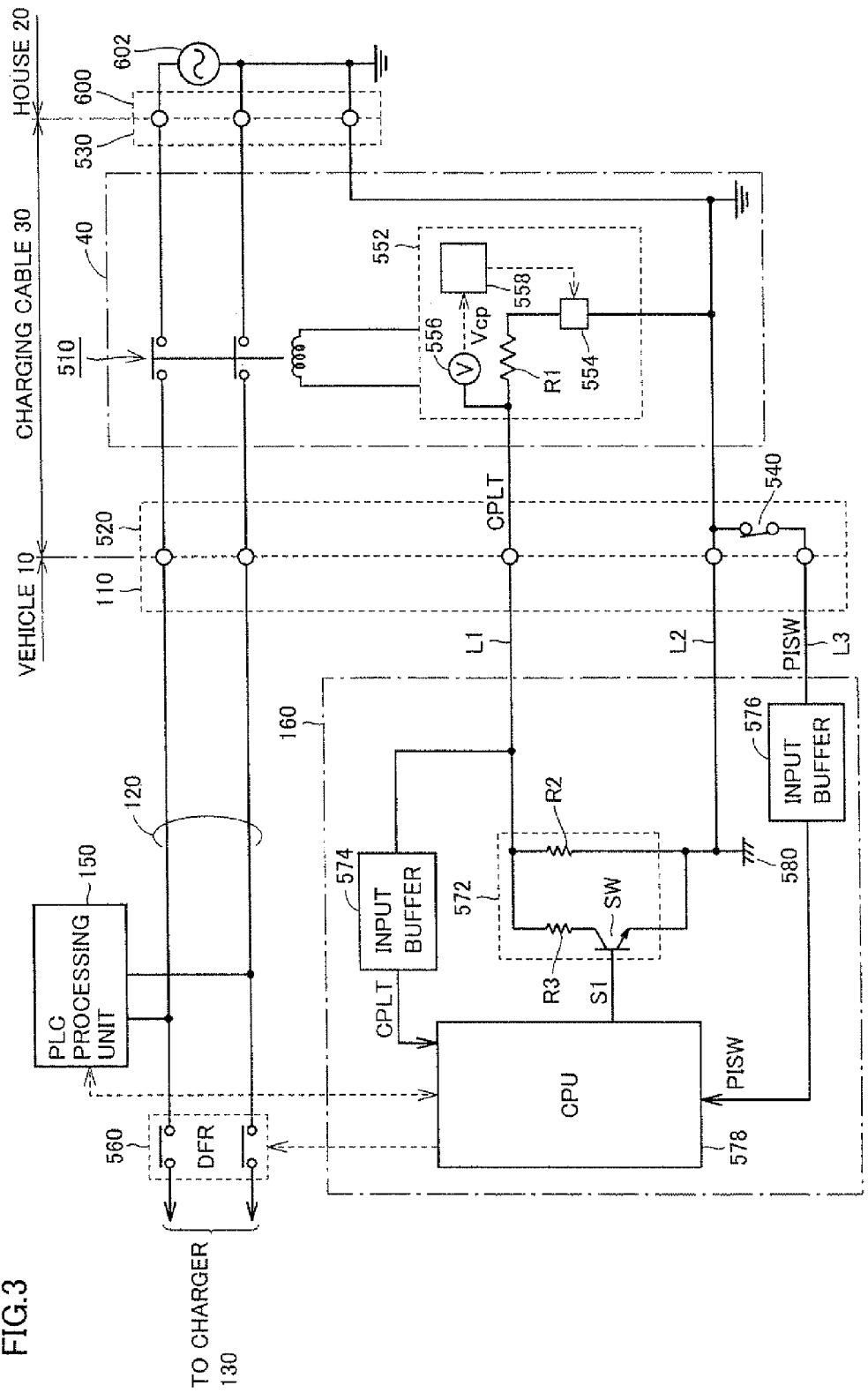
FIG. 3 is a diagram for illustrating an electrical configuration of the charging system.

FIG. 3 is a diagram for illustrating an electrical configuration of the charging system. Referring to FIG. 3, when the vehicle is externally charged, vehicle 10 and house 20 (external power supply) are connected to each other by charging cable 30. Charging cable 30 is provided with CCID 40. A plug 530 of charging cable 30 is connected to an electrical outlet 600 of house 20.

A connector 520 of charging cable 30 is connected to charging port 110 of vehicle 10. Connector 520 is provided with a limit switch 540. When connector 520 is connected to charging port 110, limit switch 540 is activated. Then, a cable connection signal PISW whose signal level changes in response to the activation of limit switch 540 is input to charging ECU 160 of vehicle 10.

CCID 40 includes a CCID relay 510 and a control pilot circuit 552. CCID relay 510 is provided on an electric power line of charging cable 30, and is turned on/off by control pilot circuit 552. Control pilot circuit 552 outputs a pilot signal CPLT to charging ECU 160 of vehicle 10 through connector 520 and charging port 110. This pilot signal CPLT is a signal for informing charging ECU 160 of vehicle 10 of an allowable current value (rated current) of charging cable 30, and for detecting the state of vehicle 10 (whether or not preparation for charging has been completed, for example) based on the potential of pilot signal CPLT manipulated by charging ECU 160. Control pilot circuit 552 controls CCID relay 510 based on a change in the potential of pilot signal CPLT.

Control pilot circuit 552 includes an oscillator 554, a resistive element R1, a voltage sensor 556, and a CPLT-ECU 558. Oscillator 554 generates, based on a command received from CPLT-ECU 558, pilot signal CPLT which oscillates at a specified frequency (1 kHz for example) and a predetermined duty ratio. Voltage sensor 556 detects a potential Vcp of pilot signal CPLT and outputs the value of the detected potential to CPLT-ECU 558. When potential Vcp of pilot signal CPLT detected by voltage sensor 556 is around a specified potential V0 (12 V for example), CPLT-ECU 558 controls oscillator 554 so that the oscillator generates a non-oscillating pilot signal CPLT. When potential Vcp of pilot signal CPLT decreases from V0, CPLT-ECU 558 controls oscillator 554 so that the oscillator generates pilot signal CPLT oscillating at a specified frequency and a predetermined duty ratio.

Here, potential Vcp of pilot signal CPLT is manipulated by switching of a resistance value of a resistive circuit 572 of charging ECU 160 as will be described later herein. In addition, the duty ratio is set based on the allowable current value of charging cable 30 that is determined in advance. When potential Vcp of pilot signal CPLT decreases to around a specified potential V2 (6 V for example), control pilot circuit 552 turns on CCID relay 510.

It is noted that control pilot circuit 552 receives electric power to operate that is supplied from an external power supply 602 when plug 530 is connected to electrical outlet 600 of house 20.

As for vehicle 10, a DFR (Dead Front Relay) 560 is provided on electric power input line 120 disposed between charging port 110 and charger 130 (FIGS. 1 and 2), and PLC processing unit 150 is connected between charging port 110 and DFR 560. DFR 560 is a relay for electrically connecting/disconnecting charging port 110 and charger 130, and is turned on/off in response to a control signal from charging ECU 160.

Charging ECU 160 includes resistive circuit 572, input buffers 574, 576, and a CPU (Control Processing Unit) 578. Resistive circuit 572 includes pull-down resistors R2, R3 and a switch SW. Pull-down resistor R2 is connected between a vehicle earth 580 and a control pilot line L1 through which pilot signal CPLT is communicated. Pull-down resistor R3 and switch SW are serially connected between vehicle earth 580 and control pilot line L1. Switch SW is turned on/off in response to a signal S1 from CPU 578.

This resistive circuit 572 manipulates potential Vcp of pilot signal CPLT. Specifically, when connector 520 of charging cable 30 is not connected to charging port 110, potential Vcp of pilot signal CPLT is V0 (12 V for example). When connector 520 is connected to charging port 110, resistive circuit 572 lowers potential Vcp of pilot signal. CPLT to a specified potential V1 (9 V for example) by using pull-down resistor R2 (switch SW is OFF). When preparation for charging is completed in vehicle 10, CPU 578 turns on switch SW, and resistive circuit 572 lowers potential Vcp of pilot signal CPLT to a specified potential V2 (6 V for example) by using pull-down resistors R2 and R3.

Thus, resistive circuit 572 is used to manipulate potential Vcp of pilot signal CPLT and thereby inform CCID 40 of the state of vehicle 10. Further, control pilot circuit 552 turns on/off CCID relay 510 based on potential Vcp of pilot signal CPLT, and resistive circuit 572 is used to manipulate potential Vcp of pilot signal CPLT and thereby remotely control CCID relay 510 of CCID 40 by charging ECU 160.

Input buffer 574 receives pilot signal CPLT of control pilot line L1, and outputs the received pilot signal CPLT to CPU 578. Input buffer 576 receives cable connection signal PISW from a signal line L3 connected to limit switch 540 of connector 520, and outputs the received cable connection signal PISW to CPU 578.

It is noted that a voltage is applied to signal line L3 from charging ECU 160. When connector 520 is connected to charging port 110, limit switch 540 is turned on to cause the potential of signal line L3 to become the ground level. In other words, cable connection signal PISW is a signal that is set to the L (logical low) level when connector 520 is connected to charging port 110, and is set to the H (logical high) level when connector 520 is not connected to charging port 110.

CPU 578 detects that charging port 110 and connector 520 of charging cable 30 are connected, based on cable connection signal PISW. When connector 520 is connected to charging port 110, potential Vcp of pilot signal CPLT lowers from V0 to V1 and pilot signal CPLT oscillates. CPU 578 detects the allowable current value of charging cable 30, based on the duty ratio of pilot signal CPLT.

When predetermined preparation for charging of power storage device 380 is thereafter completed, CPU 578 activates signal S1 and turns on switch SW. Accordingly, potential Vcp of pilot signal CPLT decreases to V2, and CCID relay 510 in CCID 40 is turned on. After this, CPU 578 turns on DFR 560. Accordingly, the electric power supplied from house 20 is fed to charger 130 (FIGS. 1 and 2). CPU 578 then controls charger 130 to thereby charge power storage device 380 (FIG. 2). CPU 578 also outputs a communication command to PLC processing unit 150. Accordingly, PLC-based communication is established between PLC processing unit 150 and the PLC processing unit of house 20, and PLC-based communication can thus be performed between vehicle 10 and house 20.

Further, when charging of power storage device 380 comes to an end, CPU 578 confirms whether or not PLC-based communication between vehicle 10 and house 20 has come to an end, rather than immediately turns off CCID relay 510 of CCID 40 by inactivating signal S1. In the case where communication has come to an end, CPU 578 inactivates signal S1 to turn off CCID relay 510 and, in the case where communication has not come to an end, CPU 578 keeps signal S1 active to maintain the ON state of CCID relay 510 so that communication will not be interrupted.

Figure 4:
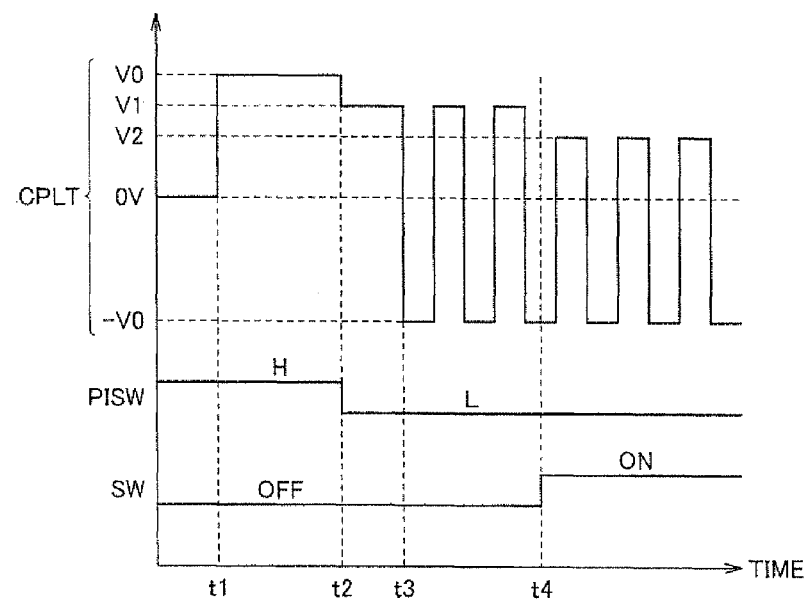
FIG. 4 is a diagram showing a variation of the potential of a pilot signal.

FIG. 4 is a diagram showing a variation of the potential of pilot signal CPLT. Referring to FIGS. 4 and 3, when plug 530 of charging cable 30 is connected to electrical outlet 600 of house 20 at time t1, control pilot circuit 552 receiving electric power from house 20 generates pilot signal CPLT. It is noted that, at this time, connector 520 of charging cable 30 is not connected to charging port 110 of vehicle 10, the potential of pilot signal CPLT is V0 (12 V for example), and pilot signal CPLT is in a non-oscillating state.

At time t2, connector 520 is connected to charging port 110 (cable connection signal PISW changes from H level to L level), and pull-down resistor R2 of resistive circuit 572 causes the potential of pilot signal CPLT to decrease to V1 (9 V for example). Then, at time t3, control pilot circuit 552 causes pilot signal CPLT to oscillate. When preparation for charging control is completed in vehicle 10, CPU 578 activates signal S1 and switch SW is turned on at time t4. Accordingly, pull-down resistors R2 and R3 of resistive circuit 572 cause the potential of pilot signal CPLT to further decrease to V2 (6 V for example).

When the potential of pilot signal CPLT decreases to V2, control pilot circuit 552 causes CCID relay 510 of CCID 40 to turn on. DFR 560 in vehicle 10 is thereafter turned on and power storage device 380 starts being charged.

Figure 5:
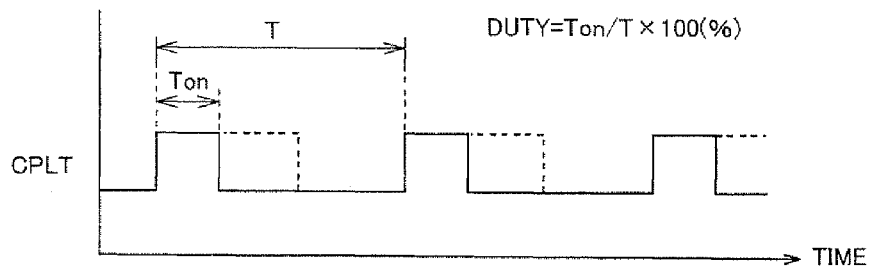
FIG. 5 is a waveform diagram of the pilot signal.

FIG. 5 is a waveform diagram of pilot signal CPLT. Referring to FIG. 5, pilot signal CPLT oscillates with a specified period T. Here, a pulse width Ton of pilot signal CPLT is set based on a predetermined allowable current value (rated current) of charging cable 30. By means of the duty ratio expressed as the ratio of pulse width Ton to period T, control pilot circuit 552 informs charging ECU 160 of vehicle 10 of the allowable current value of charging cable 30.

It is noted that the allowable current value is defined for each charging cable. Depending on the type of the charging cable, the allowable current value varies, and therefore, the duty ratio of pilot signal CPLT also varies. Charging ECU 160 of vehicle 10 receives, through control pilot line L1, pilot signal CPLT sent from control pilot circuit 552 provided on charging cable 30, and detects the duty ratio of the received pilot signal CPLT to thereby detect the allowable current value of charging cable 30 and perform charging control so that the charging current will not exceed the allowable current value.

Figure 6:
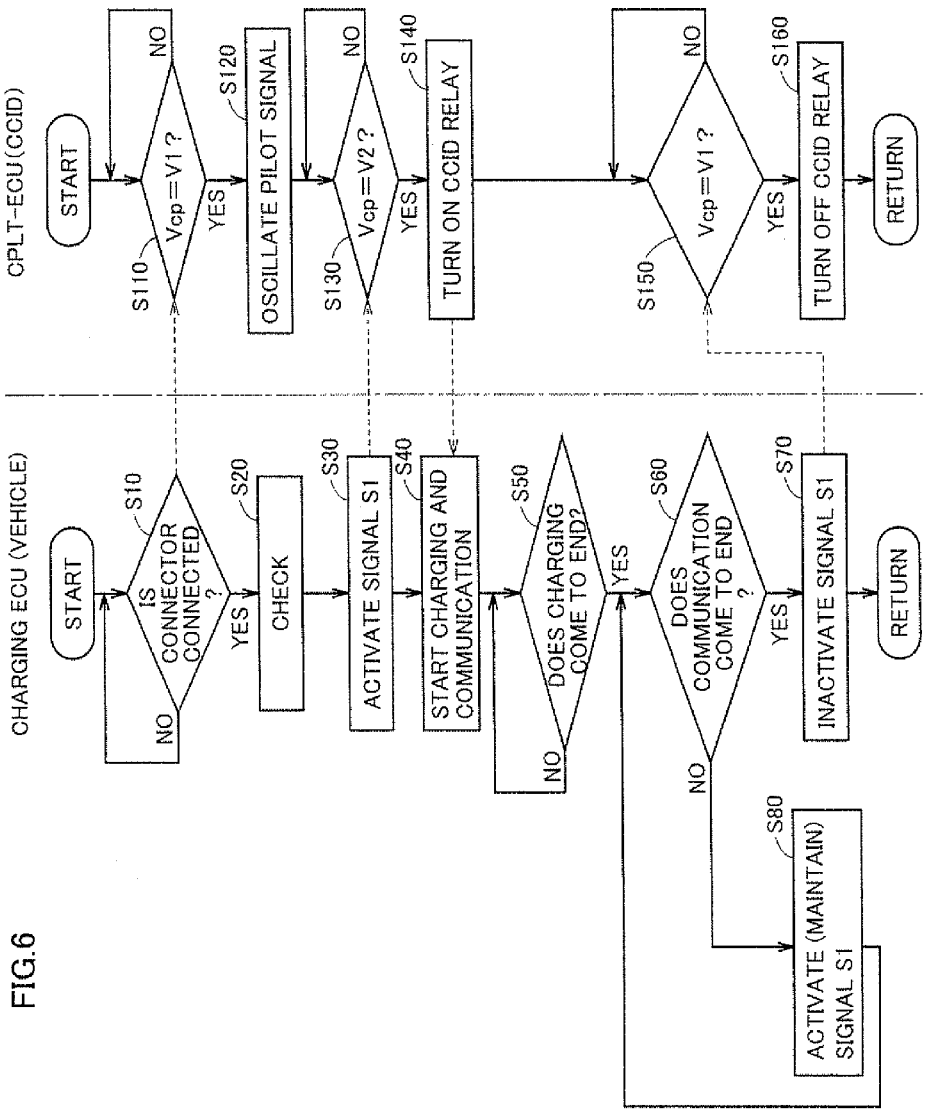
FIG. 6 is a flowchart for illustrating a procedure of a process executed by a CPU of a charging ECU shown in FIG. 3.

FIG. 6 is a flowchart for illustrating a procedure of a process executed by CPU 578 of charging ECU 160 shown in FIG. 3. Referring to FIGS. 6 and 3, CPU 578 of charging ECU 160 determines whether or not connector 520 of charging cable 30 is connected to charging port 110 (step S10). When connection of connector 520 is detected (YES in step S10), CPU 578 performs a predetermined check for performing charging control (step S20). It is noted that, when connector 520 is connected to charging port 110, potential Vcp of pilot signal CPLT decreases from V0 to V1.

When the predetermined check has been performed and preparation for charging has been completed, CPU 578 activates signal S1 to be output to switch SW of resistive circuit 572 (step S30). It is noted that, when activation of signal S1 causes switch SW to be turned on, potential Vcp of pilot signal CPLT decreases to V2. Accordingly, in CCID 40, CCID relay 510 is turned on. After this, CPU 578 controls charger 130 to cause power storage device 380 to start being charged, and outputs a communication command to PLC processing unit 150 to cause PLC-based communication with house 20 to be started (step S40).

Subsequently, CPU 578 determines whether or not charging of power storage device 380 has come to an end (step S50). For example, when the SOC of power storage device 380 reaches a predetermined upper limit, charging ends. When it is determined that charging of power storage device 380 has come to an end (YES in step S50), CPU 578 further determines whether or not PLC-based communication with house 20 has come to an end (step S60).

When it is determined that communication has come to an end (YES in step S60), CPU 578 inactivates signal S1 to be output to switch SW of resistive circuit 572 (step S70). Accordingly, potential Vcp of pilot signal CPLT becomes V1, and CCID relay 510 is turned off.

In contrast, when it is determined in step S60 that PLC-based communication with house 20 has not come to an end (NO in step S60), CPU 578 activates (maintains) signal S1 (step S80). Accordingly, CCID relay 510 is kept in the ON state and communication with house 20 is continued. After this, the process returns to step S60.

In CCID 40, CPLT-CPU 558 determines whether or not potential Vcp of pilot signal CPLT has decreased from V0 to V1 (step S110). When connector 520 of charging cable 30 is connected to charging port 110 of vehicle 10 and potential Vcp of pilot signal CPLT decreases to V1 (YES in step S110), CPLT-CPU 558 causes pilot signal CPLT to oscillate (step S120).

Subsequently, CPLT-CPU 558 determines whether or not potential Vcp of pilot signal CPLT has decreased from V1 to V2 (step S110). When signal S1 is activated in vehicle 10 and potential Vcp of pilot signal CPLT decreases to V2 (YES in step S130), CPLT-CPU 558 causes CCID relay 510 to be turned on (step S140).

After this, CPLT-CPU 558 determines whether or not potential Vcp of pilot signal CPLT has returned to V1 (step S150). When signal S1 is inactivated in vehicle 10 and potential Vcp of pilot signal CPLT returns to V1 (YES in step S150), CPLT-CPU 558 causes CCID relay 510 to be turned off (step S160).

As seen from the above, in the first embodiment, charging cable 30 can be connected to charging port 110 of vehicle 10 to thereby cause external charging to be performed. Further, charging port 110 and charging cable 30 can be used as a communication path to thereby cause PLC-based communication to be performed between vehicle 10 and house 20. When PLC-based communication has come to an end at the time when external charging comes to an end, CCID relay 510 provided on charging cable 30 is controlled so that the relay is in the OFF state. When PLC-based communication is continuing at the time when external charging comes to an end, CCID relay 510 is kept in the ON state. Therefore, it will not occur that PLC-based communication is interrupted at the time when external charging comes to an end. Thus, the first embodiment can implement a charging system that enables external charging and enables PLC-based communication to be reliably accomplished to the end of communication.

Second Embodiment

In a second embodiment, a lock mechanism for locking connection between connector 520 of charging cable 30 and charging port 110 is provided. During external charging, connection of connector 520 and charging port 110 is locked by the lock mechanism. Particularly, in the second embodiment, locking of connection by the lock mechanism is continued in the case where PLC-based communication between vehicle 10 and house 20 is continuing, even if external charging has come to an end.

Figure 7:
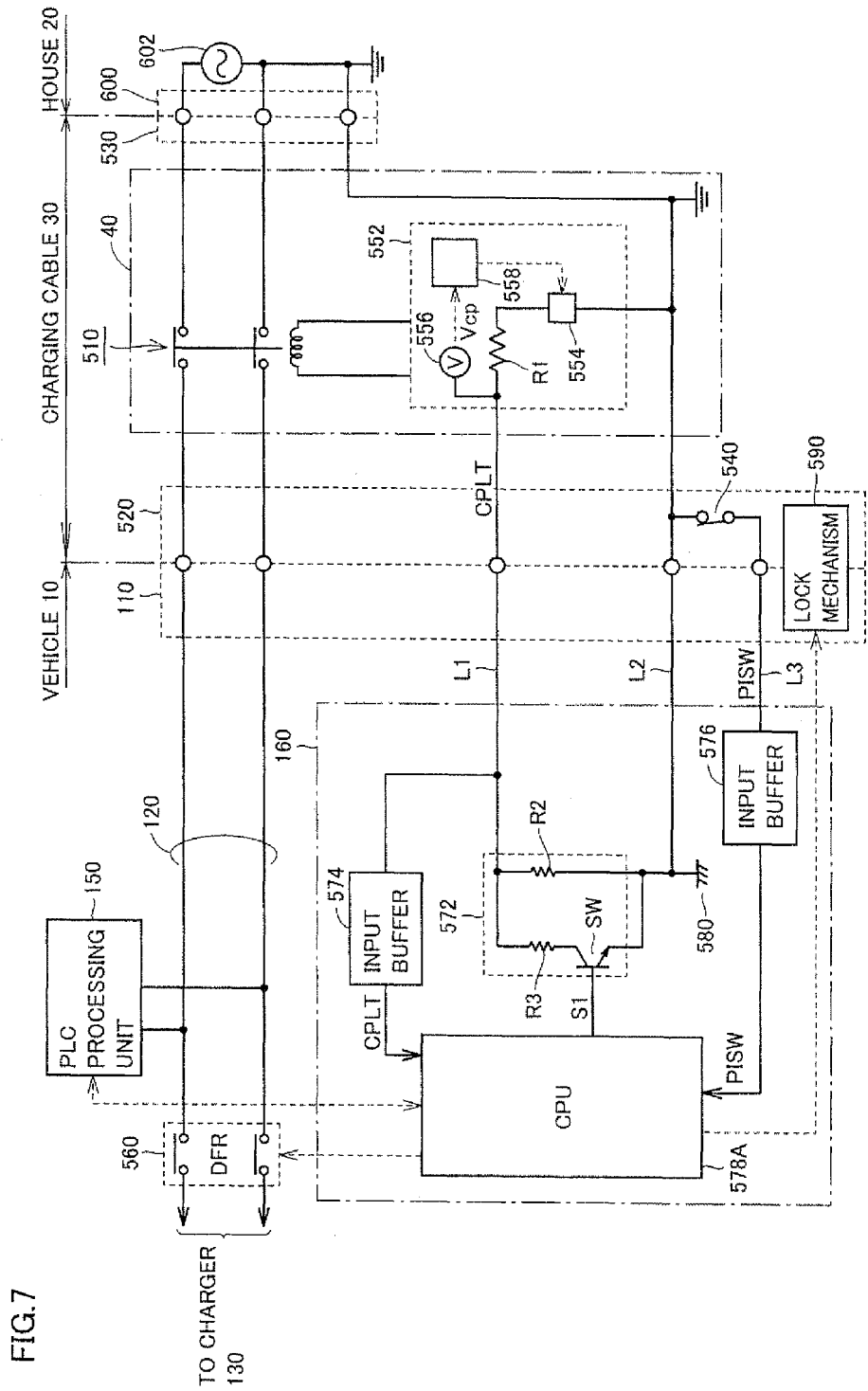
FIG. 7 is a diagram for illustrating a configuration of a charging system according to a second embodiment.

FIG. 7 is a diagram for illustrating a configuration of a charging system in the second embodiment. Referring to FIG. 7, the charging system in the second embodiment differs in configuration from the charging system in the first embodiment shown in FIG. 3 in that the former further includes a lock mechanism 590 and a CPU 578A in vehicle 10 instead of CPU 578.

Lock mechanism 590 is provided to charging port 110 of vehicle 10 and connector 520 of charging cable 30. When lock mechanism 590 receives a lock command from CPU 578A of charging ECU 160, lock mechanism 590 locks connection between connector 520 and charging port 110. When lock mechanism 590 receives an unlocking command from CPU 578A, it unlocks the connection.

CPU 578A controls the operation of lock mechanism 590. By way of example, CPU 578A controls the operation of lock mechanism 590 in synchronization with a smart entry system that enables a vehicle's door to be locked/unlocked or the engine to be started without a mechanical key. Specifically, in synchronization with activation of a smart door lock capability of the smart entry system (the capability for example to lock the doors of all seats when a user carrying an electronic key touches a lock sensor of a door handle), CPU 578A outputs a lock command to lock mechanism 590. Further, in synchronization with activation of a smart door unlock capability of the smart entry system (the capability for example to unlock the doors of all seats when a user carrying an electronic key touches an unlock sensor of a door handle), CPU 578A outputs an unlocking command to lock mechanism 590.

Here, when external charging comes to an end, CPU 578A determines whether or not PLC-based communication with house 20 has come to an end. When PLC-based communication has come to an end, CPU 578A outputs an unlocking command to lock mechanism 590. When PLC-based communication has not come to an end, CPU 578A does not output the unlocking command to lock mechanism 590. Namely, while the connection between connector 520 of charging cable 30 and charging port 110 may be unlocked at the time when external charging comes to an end, the lock is maintained when PLC-based communication is continuing, in order to prevent interruption of the communication by user's inadvertent detachment of connector 520 from charging port 110. At the time when the communication thereafter comes to an end, the unlocking command is output to lock mechanism 590 to unlock connection of connector 520 and charging port 110.

Other capabilities of CPU 578A are identical to those of CPU 578 of the first embodiment shown in FIG. 3.

Figure 8:
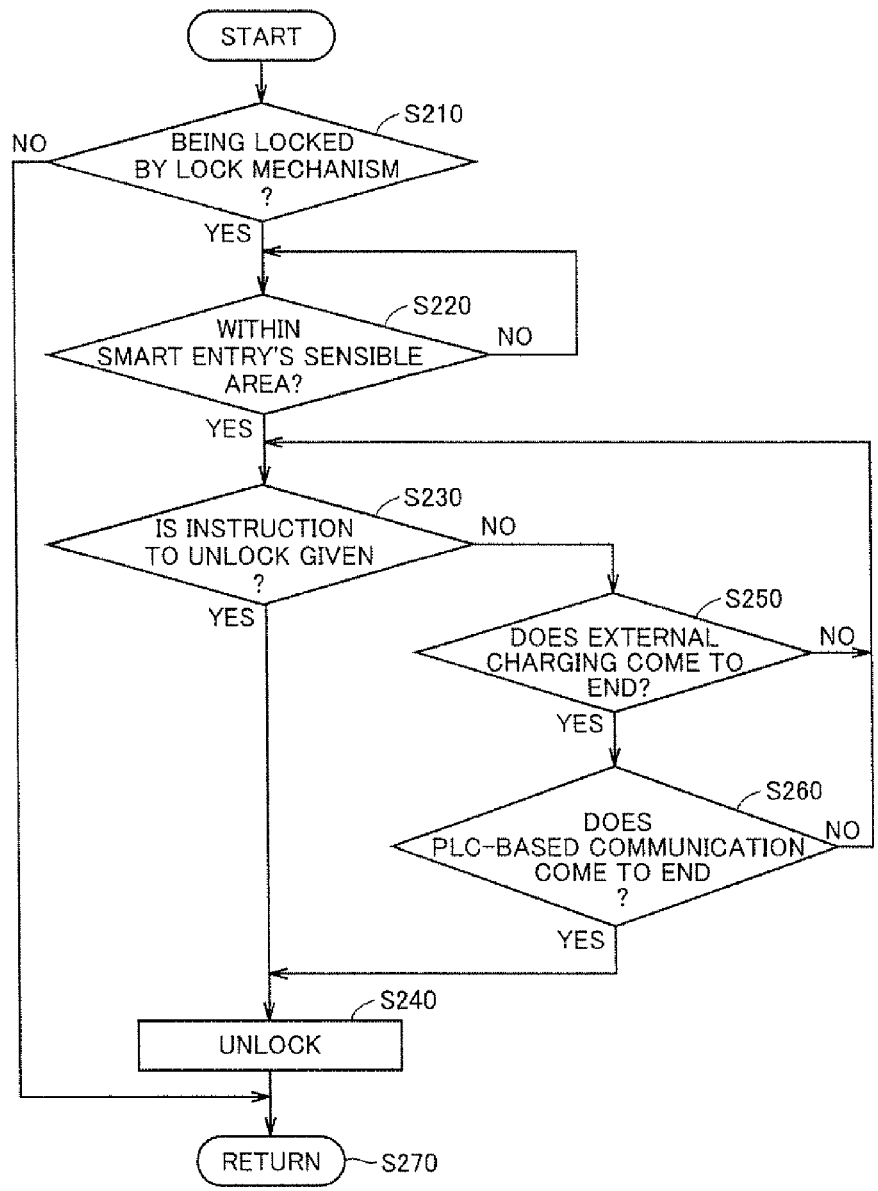
FIG. 8 is a flowchart for illustrating a procedure of an unlocking process of a lock mechanism that is performed by a CPU shown in FIG. 7.

FIG. 8 is a flowchart for illustrating a procedure of an unlocking process of lock mechanism 590 that is performed by CPU 578A shown in FIG. 7. Referring to FIG. 8, CPU 578A determines whether or not lock mechanism 590 is locking the connection (step S210). When the connection has been unlocked (NO in step S210), CPU 578A proceeds to step S270 without performing the subsequent series of steps.

When it is determined in step S210 that lock mechanism 590 is locking the connection (YES in step S210), CPU 578A determines whether or not an electronic key is located within a predetermined sensible area of the smart entry (namely whether or not a user carrying the electronic key is located in a predetermined sensible area of the smart entry) (step S220). When it is determined that the electronic key is located within the sensible area of the smart entry (YES in step S220), CPU 578A determines whether or not an instruction to unlock has been given by activation of a smart door unlock capability (step S230). When it is determined that the instruction to unlock has been given (YES in step S230), CPU 578A outputs an unlocking command to lock mechanism 590. Accordingly, the connection between connector 520 and charging port 110 having been locked by lock mechanism 590 is unlocked (step S240).

In contrast, when it is determined in step S230 that the instruction to unlock has not been given (NO in step S230), CPU 578A determines whether or not external charging has come to an end (step S250). For example, when the SOC of power storage device 380 reaches a predetermined upper limit, external charging is ended. When it is determined that external charging has not come to an end (NO in step S250), CPU 578A returns to step S230.

In contrast, when it is determined in step S250 that external charging has come to an end (YES in step S250), CPU 578A determines whether or not PLC-based communication that uses charging port 110 and charging cable 30 as a communication path has come to an end (step S260). When it is determined that PLC-based communication has also come to an end (YES in step S260), CPU 578A proceeds to step S240, and the connection between connector 520 and charging port 110 having been locked by lock mechanism 590 is unlocked.

In contrast, when it is determined in step S260 that PLC-based communication has not come to an end (NO in step S260), CPU 578A returns to step S230. Namely, in this case, in order to prevent connector 520 of charging cable 30 from being inadvertently removed from charging port 110 by a user, the lock of the connection by lock mechanism 590 is maintained.

As seen from the above, in the second embodiment, lock mechanism 590 for locking connection between connector 520 of charging cable 30 and charging port 110 is provided. Even if external charging has come to an end, lock of the connection by lock mechanism 590 is kept when PLC-based communication continues between vehicle 10 and house 20. Thus, after external charging ends, communication can be prevented from being broken due to user's inadvertent removal of connector 520 from charging port 110. Accordingly, the second embodiment can also implement a charging system that enables external charging and enables PLC-based communication to be reliably accomplished to the end of communication.

Third Embodiment

In a third embodiment, timer-controlled charging is performed for which the completion time of external charging can be set. Here, if the time required for PLC-based communication is longer than the time required for external charging, the PLC-based communication will not come to completion at the set completion time and accordingly the PLC-based communication may be broken when external charging ends. In view of this, the third embodiment provides a strategy for causing PLC-based communication to end before the set completion time.

Figure 9:
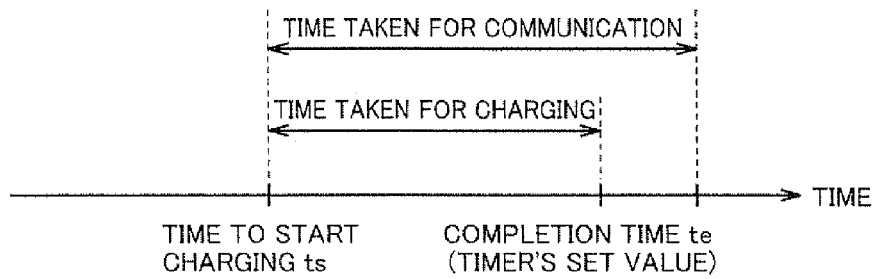
FIG. 9 is a diagram showing an example of the time taken for PLC-based communication and the time taken for external charging.

FIG. 9 is a diagram showing an example of the time taken for PLC-based communication and the time taken for external charging. Referring to FIG. 9, completion time "te" of timer-controlled charging is set. Based on the SOC of power storage device 380 (FIG. 2) and the charging rate of external charging, the time taken for charging is calculated. Based on the calculated time to be taken for charging, the time to start charging "ts" is determined.

When the time to start charging ts is reached, external charging is started and PLC-based communication is also started. Here, if a large amount of data is to be communicated based on PLC and thus the time taken for PLC-based communication should be longer than the time taken for external charging, PLC-based communication will not come to an end at the completion time te and PLC-based communication will be interrupted.

Figure 10:
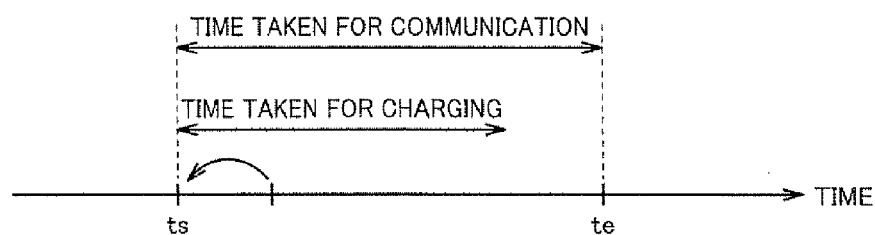
FIG. 10 is a diagram showing an example of the time taken for PLC-based communication and the time taken for external charging in a third embodiment.
Figure 11:
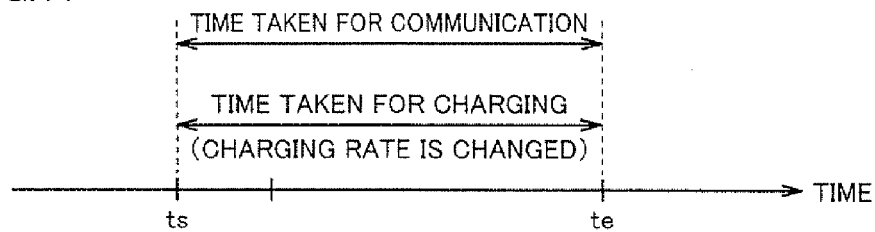
FIG. 11 is a diagram showing another example of the time taken for PLC-based communication and the time taken for external charging in the third embodiment.

According to the third embodiment, if the time required for PLC-based communication is expected to be longer than the time required for external charging, the time to start charging ts is advanced as shown in FIG. 10 so that PLC-based communication will come to an end at the set completion time te. Alternatively, the charging rate of external charging is changed as shown in FIG. 11 so that the time taken for external charging is equal to or longer than the time taken for PLC-based communication (by way of example, FIG. 11 illustrates the case where the time taken for charging is equal to the time taken for communication). In this way, PLC-based communication can be ended at the completion time te.

The overall configuration of the charging system and the vehicle as well as the electrical configuration of the charging system in the third embodiment are identical those in the first embodiment or second embodiment.

Figure 12:
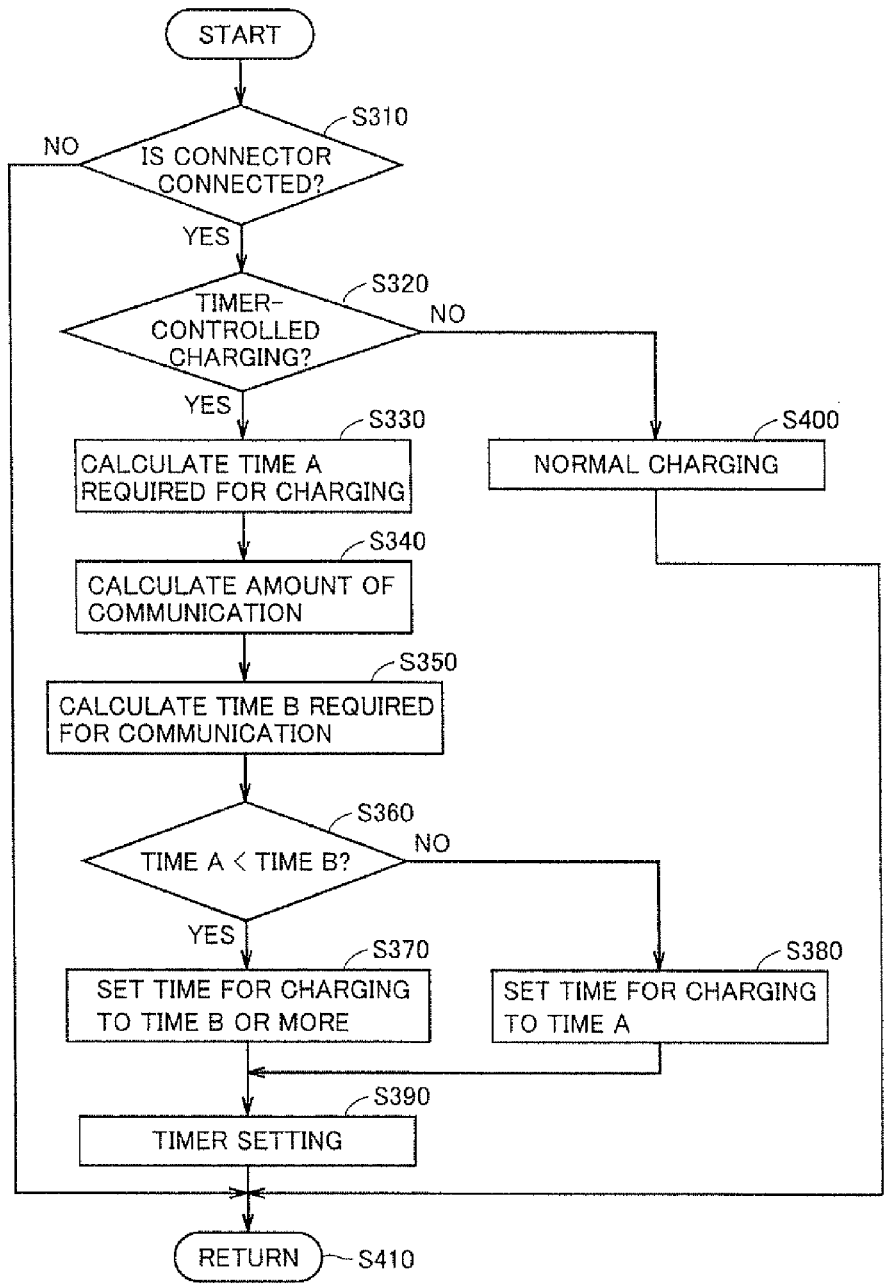
FIG. 12 is a flowchart for illustrating a procedure of a timer setting process for timer-controlled charging executed in the third embodiment.

FIG. 12 is a flowchart for illustrating a procedure of a timer setting process for timer-controlled charging executed in the third embodiment. Referring to FIG. 12, CPU 578 of charging ECU 160 determines whether or not connector 520 of charging cable 30 has been connected to charging port 110 (step S310). When connection of connector 520 has not been detected (NO in step S310), CPU 578 proceeds to step S410 without performing the subsequent series of steps.

When it is determined in step S310 that connector 520 has been connected to charging port 110 (YES in step S310), CPU 578 determines whether to perform timer-controlled charging (step S320). For example, when a user sets the charging completion time and gives an instruction to execute timer-controlled charging, it is determined that timer-controlled charging is to be performed. When it is determined that timer-controlled charging is not to be performed (NO in step S320), CPU 578 starts execution of normal charging, namely immediately starts execution of external charging (step S400).

When it is determined in step S320 that timer-controlled charging is to be performed (YES in step S320), CPU 578 calculates time A required for external charging (step S330). For example, based on the SOC of power storage device 380 and a predetermined charging rate, time A can be calculated.

Subsequently, CPU 578 calculates the amount of communication to be communicated based on PLC (step S340). It is noted that the amount of communication can be calculated based on the amount of each data item to be communicated based on PLC. Subsequently, CPU 578 further calculates time B required for communication based on the calculated amount of communication (step S350). For example, based on the calculated amount of communication and the rate of PLC-based communication, time B can be calculated.

CPU 578 then determines whether or not time B calculated in step S350, namely the time for communication is longer than time A calculated in step S330, namely the time for charging (step S360). When it is determined that time B is longer than time A (YES in step S360), namely it is determined that the time for communication is longer than the time for charging, CPU 578 sets the time for charging so that it is equal to or longer than time B (>time A) (step S370). At this time, CPU 578 may change the charging rate based on the set time. Specifically, the required charging amount calculated from the SOC of power storage device 380 can be divided by the set time (time B for example) to calculate the changed charging rate. In the case where the set time is time B, external charging is performed as shown in FIG. 11 so that the time for charging is equal to the time for communication. In the case where the charging rate is not changed, the time to start charging ts is advanced based on the set time as shown in FIG. 10, and thus actual charging comes to an end before the completion time te by the amount of advanced time.

In contrast, when it is determined in step S360 that time B is equal to or shorter than time A (NO in step S360), namely it is determined that the time for communication is equal to or shorter than the time for charging, CPU 578 sets the time for charging to time A (step S380). In step S390, based on the completion time te and time A having been set by the user, timer setting (setting of the time to start charging ts) is performed.

As seen from the above, in the third embodiment, time A required for external charging and time B required for PLC-based communication are calculated. When time B is longer than time A, the time for charging is adjusted so that PLC-based communication reaches completion. Specifically, when time B is longer than time A, the time to start charging ts is advanced, or the rate of external charging is lowered so that the time for charging is equal to or longer than the time for communication. In this way, at the completion time te of timer-controlled charging, PLC-based communication can be ended together with external charging. Accordingly, the third embodiment can implement a charging system as well that enables external charging and enables PLC-based communication to be reliably accomplished to the end of communication.

In the foregoing embodiments each, vehicle 10 is connected to an electrical outlet of house 20 and charged by the system power supply. The external power supply which supplies the charging electric power to vehicle 10 is not limited to such a power supply. For example, a power supply of a distributed power supply system that is installed in house 20 may be used for charging, or vehicle 10 may be connected to a dedicated charging station external to the house so that vehicle 10 is charged.

In the foregoing, charger 130 dedicated to external charging is used in vehicle 10 to charge power storage device 380 from an external power supply. Alternatively, dedicated charger 130 may not be provided, electric power input line 120 connected to charging port 110 may be connected to respective neutral points of motor generators 330, 350, and the voltage between the neutral points may be adjusted by inverters 400, 410 to thereby charge power storage device 380 with a charging voltage into which electric power supplied from the external power supply has been converted.

In the foregoing, vehicle 10 is a hybrid vehicle mounted with engine 310 and motor generator 350 as a source of power for the vehicle to travel. Applications of the present invention, however, are not limited to the hybrid vehicle, and include an electric vehicle without engine mounted thereon, a fuel cell vehicle mounted with a fuel cell as a DC power supply, and the like.

In the foregoing, CCID relay 510 corresponds to an embodiment of "relay" of the present invention, and charging ECU 160 corresponds to an embodiment of "control unit" of the present invention. PLC processing unit 150 corresponds to an embodiment of "communication unit" of the present invention, and PLC processing unit 220 corresponds to an embodiment of "communication device external to vehicle" of the present invention. Control pilot circuit 552 corresponds to an embodiment of "signal generation unit" of the present invention, and resistive circuit 572 corresponds to an embodiment of "signal manipulation unit" of the present invention.

It should be construed that the embodiments disclosed herein are by way of illustration in all respects, not by way of limitation. It is intended that the scope of the present invention is defined by claims, not by the above description of the embodiments, and encompasses all modifications and variations equivalent in meaning and scope to the claims.

REFERENCE SIGNS LIST 10 vehicle; 20 house; 30 charging cable; 40 CCID; 110 charging port; 120 electric power input line; 130 charger; 140 motive power output device; 150, 220 PLC processing unit; 160 charging ECU; 210 electric power line; 230 server; 310 engine; 320 power split device; 330, 350 motor generator; 340 reduction gear; 360 drive shaft; 370 drive wheel; 380 power storage device; 390 boost converter; 400, 410 inverter; 420 MG-ECU; 510 CCID relay; 520 connector; 530 plug; 540 limit switch; 552 control pilot circuit; 554 oscillator; 556 voltage sensor; 558 CPLT-ECU; 560 DFR; 572 resistive circuit; 574, 576 input buffer; 578, 578A CPU; 580 vehicle earth; 590 lock mechanism; 600 electrical outlet; 602 external power supply; R1 resistive element; R2, R3 pull-down resistor; L1 control pilot line; L2 ground line; L3 signal line

The invention claimed is:

1. A charging system comprising:
    a vehicle configured to be chargeable by an external power supply external to the vehicle;
    a charging cable for supplying electric power from said external power supply to said vehicle; and
    a relay provided on said charging cable,
    said vehicle including:
    a rechargeable power storage device;
    a charging port configured so that said charging cable can be connected to the charging port;
    a charger receiving electric power supplied from said external power supply for charging said power storage device;
    a control unit controlling said relay so that said relay is in an ON state while said power storage device is charged by said charger; and
    a communication unit using said charging port and said charging cable as a communication path for communicating with a communication device external to the vehicle,
    said control unit controlling said relay so that said relay is in an OFF state, in a case where communication with said communication device external to the vehicle by said communication unit has come to an end when charging of said power storage device by said charger comes to an end, and
    said control unit maintaining said relay in the ON state, in a case where communication with said communication device by said communication unit is continuing when charging of said power storage device by said charger comes to an end.

2. The charging system according to claim 1, further comprising a signal generation unit configured to generate a pilot signal for detecting a state of said vehicle and transmit said pilot signal to said vehicle via said charging cable, wherein
    said control unit includes a signal manipulation unit configured to manipulate a potential of said pilot signal for informing said signal generation unit of the state of said vehicle,
    said signal manipulation unit manipulates the potential of said pilot signal in accordance with whether or not communication with said communication device external to said vehicle by said communication unit has come to an end when charging of said power storage device by said charger comes to an end, and
    said signal generation unit manipulates said relay in accordance with the potential of said pilot signal.

3. The charging system according to claim 1, further comprising a lock mechanism for locking a state of connection between said charging cable and said charging port, wherein
    said control unit further controls said lock mechanism so that said state of connection is locked while said power storage device is charged by said charger,
    said control unit further controls said lock mechanism so that said state of connection is unlocked, in a case where communication with said communication device external to the vehicle by said communication unit has come to an end when charging of said power storage device by said charger comes to an end, and
    said control unit further controls said lock mechanism so that said state of connection continues being locked, in a case where communication with said communication device by said communication unit is continuing when charging of said power storage device by said charger comes to an end.

4. The charging system according to claim 1, wherein said control unit further calculates time for charging required for charging said power storage device by said charger and time for communication required for communicating with said communication device external to the vehicle by said communication unit, and adjusts said time for charging so that communication with said communication device is completed, in a case where said time for communication is longer than said time for charging.

5. The charging system according to claim 4, wherein said control unit changes timing at which charging of said power storage device is started so that communication with said communication device is completed when charging of said power storage device by said charger comes to an end, in a case where said time for communication is longer than said time for charging.

6. The charging system according to claim 4, wherein said control unit changes a rate of charging said power storage device so that said time for charging is equal to or longer than said time for communication, in a case where said time for communication is longer than said time for charging.

* * * * *